United States Patent Office 2,768,972
Patented Oct. 30, 1956

2,768,972
PREPARATION OF N-ACYL-β ARYL-SERINOLS

Bianka Tchoubar, Paris, France, assignor to Centre National de la Recherche Scientifique, Paris, France, a corporation of France No Drawing. Application March 10, 1952,
Serial No. 275,863

Claims priority, application France March 13, 1951

8 Claims. (Cl. 260—562)

The present invention relates to the manufacture of N-acyl-β aryl-serinols or 2-acylamino - 1 - aryl-propane-1,3-diols, which may be used as synthetic antibiotic substances or as intermediaries for the manufacture of such substances, e. g. chloramphenicol and substances of similar structure.

For the manufacture of N-acyl-β aryl-serinols, it has already been suggested to start from an oxazoline such as:

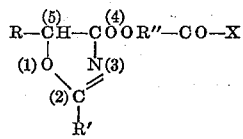

in which, for instance, R is a phenyl radical, R" a lower alkyl radical and R' and alkyl or aryl radical which may be substituted. Said oxazoline is reduced by means of a reducing substance such as lithium-aluminum hydride (LiAlH₄). Said reduction is carried out, according to the conventional method, through introducing a solution of oxazoline in a solution of the reducing substance. The opening of the pentagonal heterocycle is then performed, in order to finally obtain the desired serinol.

The N-acyl group above referred to is a member of the group consisting of NH—COCHCl₂, NH—COC₆H₅ and

NH—COCH₃

However, when operating in such a manner, it is not possible to start from an oxazoline of the above mentioned type and in which R is an aryl radical substituted by a group which is liable to be reduced by the reducing substance which is used, and to obtain directly a serinol containing the same substituting group on said radical, due to the fact that said group undergoes reduction when the oxazoline is reduced, in the first step of the process. This is a considerable drawback because it is thus impossible to manufacture directly and in a simple manner N-acyl-serinols carrying, in β position, say, a nitrophenyl radical, whereas such substances are particularly valuable. In order to obtain substituted serinols of this type by the above mentioned process, it is necessary to start, for instance, from an oxazoline, substituted in position 5 by a phenyl radical, and, after reduction of said oxazoline in order to transform the CO—R" group in a—CH₂OH group, to submit the substance resulting from said reduction successively to an acylation of said —CH₂OH group and to a nitration, before performing the opening of the heterocycle, simultaneously with the hydrolysing of the previously acylated group.

One object of the present invention is to provide a simple method for the manufacture of N-acyl-serinols comprising, in β position, an aromatic radical which is in its turn substituted by a group liable to be reduced by lithium-aluminum hydride.

Another object of the invention is to provide a method for obtaining said result when starting from an oxazoline substituted in position 5 by an aromatic radical which is in its turn substituted by a group liable to be reduced by lithium-aluminum hydride.

Still another object of the invention is to provide a method for this preparation without passing through the intermediary of an oxazoline comprising the reduced group —CH₂OH.

According to the invention, a substituted oxazoline, of the general formula:

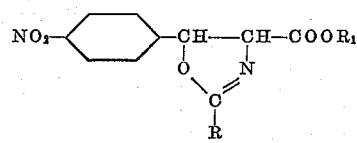

in which R is a phenyl, methyl or CHCl₂ radical, and R₁ is a lower alkyl radical, is reduced by means of lithium-aluminum hydride, through pouring an ether solution of said hydride into a solution of the oxazoline in at least one organic solvent, said solution being cooled to about 0° C. and thoroughly stirred, whereafter the resulting reduced substance is hydrolysed in acid medium in order to obtain the corresponding N-acyl-β-aryl-serinol.

The final substance has the following general formula:

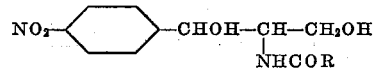

in which R is the same as above.

It has been very surprisingly found that, when the starting oxazoline is reduced according to the invention, i. e. by operating in the reverse manner with respect to the conventional manner as above referred to, it was possible to selectively reduce the —COOR₁ group of the oxazoline without modifying the substituent of the radical phenyl, which was quite unexpected.

The method according to the invention leads to an excellent yield in N-acyl-β-aryl-serinol and comprises only two, or at most three steps.

Without relying on any particular theory, experience shows that the reactions take place exactly as if lithium-aluminum hydride, acting as a specific reducing substance of the —COOR₁ group of the oxazoline, combined with said oxazoline while forming an organo-alumino-lithic complex which is afterwards decomposed through hydrolysis with simultaneous opening of the pentagonal heterocycle.

Hydrolysis of the reduced, intermediary product, may be carried out in various manners. When operating with a weak acid, such as formic or acetic acid, hydrolysis of the organo-alumino-lithic complex and hydrolytic opening of the heterocycle, leading to the formation of the desired N-acyl-β-aryl serinol are simultaneously obtained. When operating in a strong acid anhydrous medium, the hydrolysis is limited to the organo-metallic complex, an ammonium salt being formed which may then be transformed in the corresponding serinol through treatment by means of an aqueous solution of, say, sodium acetate. In this case, the obtention of N-acyl-β-aryl-serinol requires two successive steps, whereas it takes place automatically in a single step when a weak acid is used.

It will be readily appreciated that the oxazolines substituted in positions 4, 5, which are used as starting substances according to the present invention can exist in structural as well as optical isomeric forms. The term "structural" isomer or form as used herein refers to the cis or trans relationship of the substituents on the carbon atoms 4 and 5. Both the cis and trans forms exist as racemates as well as individual optically active isomers.

The same characteristics are found in the N-acyl-β-aryl-serinols finally obtained. When starting from an oxazoline having a cis structure, a substituted serinol is obtained having an erythro structure and, conversely, when starting from an oxazoline having a trans structure, a substituted serinol having a threo structure is obtained. The transformation thus leads neither to a racemisation, nor to an inversion. As concerns the antibiotic activity, the most active substances are those having a threo structure. Among these, the compound N-dichloracetyl-[L]-threo-β-p-nitro-phenyl-serinol in which the radical R is a p. nitrophenyl radical and R' is a dichloro-methyl radical is particularly active.

The invention is illustrated by the following examples:

Example 1

Starting substance: trans - 2 - phenyl - 5 - p. nitrophenyl-4-carbethoxy-oxazoline.

Said oxazoline can be obtained either by condensing ethyl iminobenzoate with the hydrochloride of ethyl-threo-p. nitro-phenyl serinate, or by condensing the hydrochloride of ethyl iminobenzoate with ethyl-threo-p. nitrophenyl serinate. Its melting point is 85–87° C.

A solution of 0.125 gr. of LiAlH₄ in ether was poured into a solution of 1.36 gr. of trans-2-phenyl-p. nitrophenyl-4-carbethoxy oxazoline in anhydrous ether, said solution being cooled at 0° C. and vigorously stirred during the pouring. An organo-metallic complex was obtained, according to the following, diagrammatic reaction

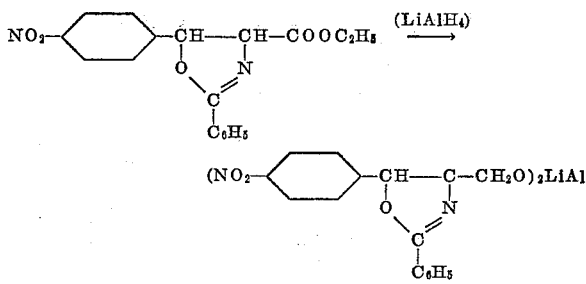

Two parts were made of the reaction mixture containing said complex, which were respectively heated in the two following manners:

(a) A solution of hydrochloride gas was introduced into the first part and the obtained precipitate of trans-2-phenyl - 5 - p.nitrophenyl-4-hydroxymethyl-oxazoline-hydrochloride was immediately collected and treated on the steam-bath by a dilute solution of sodium acetate. N - benzoyl-threo-β-p.nitrophenyl-serinol was thus obtained, which melts at 160–163° C. after being recrystallized from ethyl acetate.

The reaction may be diagrammatically illustrated as follows:

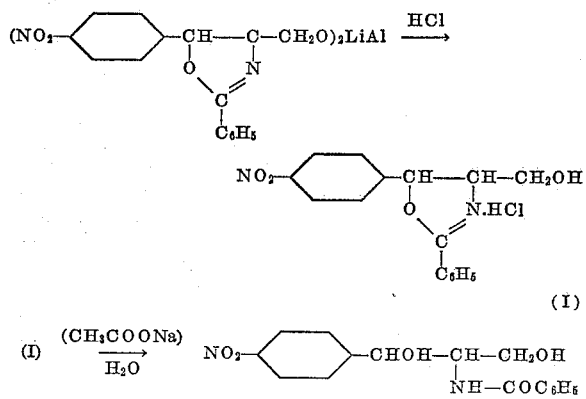

(b) A solution of about 50% acetic acid in water was poured into the second part. The mixture was left to rest and thereafter evaporated to dryness. The residue was taken up by water and extracted with ethyl acetate. After evaporating the said ethyl acetate, N-benzoyl-threo-β-p.nitrophenyl-serinol was obtained.

The reaction may be diagrammatically illustrated as follows:

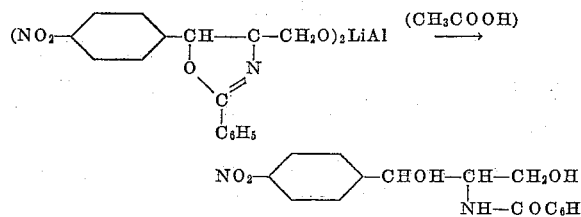

Example 2

Starting substance: trans - 2 - methyl - 5 - p.nitrophenyl-4-carbethoxy-oxazoline.

Said oxazoline can be obtained either by condensing ethyl iminoacetate with the hydrochloride of ethyl threo-β-p.nitrophenyl-serinate, or by condensing the hydrochloride of ethyl iminoacetate with ethyl threo-β-p.nitrophenyl-serinate, or by nitrating trans - 2 - methyl - 5-phenyl - 4 - carbethoxy-oxazoline. Its melting point is 91°–92° C.

A solution of 0.21 gr. of LiAlH₄ in ether was poured, while vigorously stirring, into a solution of 2.79 gr. of trans - 2 - methyl - 5 - p.nitrophenyl - 4 - carbethoxy-oxazoline in a mixture of ether and benzene, said solution being cooled at 0° C. An organo-metallic complex was obtained according to the following, diagrammatic reaction:

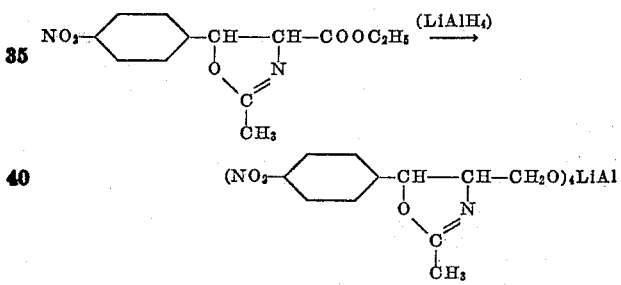

Diluted acetic acid was poured into the reaction mixture containing said complex. After evaporation of the ether and benzene over a steam bath, N-acetyl-threo-β-p.nitrophenyl-serinol crystallized by cooling the aqueous solution. The crystals were collected and taken up by a mixture of alcohol and benzene, from which recrystallization was performed. Melting point: 167.5–168.5° C.

The reaction may be illustrated as follows:

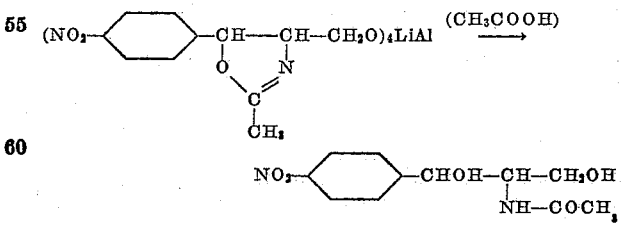

Example 3

Starting product: trans - 2 - dichloromethyl - 5 - p.nitrophenyl-4-carbethoxy-oxazoline.

Said oxazoline can be obtained either by condensing methyl iminodichloracetate and the hydro-chloride of ethyl threo-β-p.nitrophenyl-serinate, or by condensing the hydrochloride of methyl iminodichloracetate with ethyl threo-β-p.-nitrophenyl-serinate, or by nitrating trans-2-dichloromethyl-5-phenyl-4-carbethoxy-oxazoline by means of nitric acid. Melting point: 73–74° C.

A solution of 0.075 gr. of LiAlH₄ in ether was poured, while vigorously stirring, into a solution of 1.30 gr. of trans-2-dichloromethyl - 5 - p.nitrophenyl-4-carbethoxy-oxazoline in a mixture of ether and tetrahydrofuran, said solution being cooled at 0° C. An organo-metallic complex was obtained, according to the following, diagrammatic reaction:

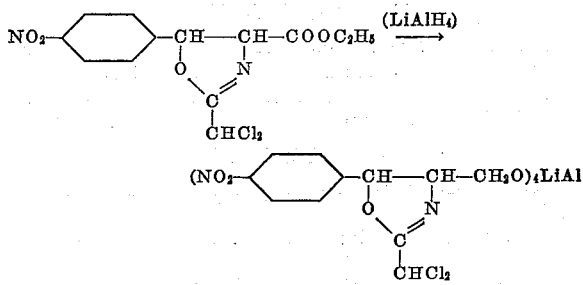

A very diluted solution of formic acid in aqueous methyl alcohol was poured into the reaction mixture containing said complex. After evaporating the solvents over a steam bath, N-dichloroacetyl-threo-β-p.nitrophenyl-serinol crystallized by cooling from the remaining aqueous solution. Melting point after recrystallizing from water: 149–151° C.

The diagrammatic reaction is as follows:

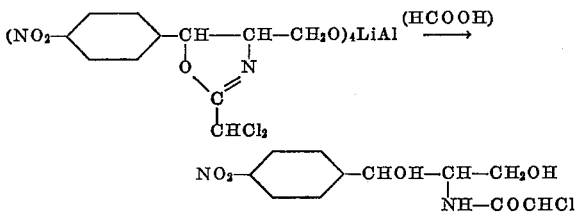

Example 4

Starting substance: [L]-trans - 2 - dichloromethyl-5-p.nitrophenyl-4-carbethoxy-oxazoline.

Said oxazoline can be obtained in the same manner as the racemic isomer of Example 3, by starting from ethyl-[L]-threo-β-p.nitrophenyl-serinate or the hydrochloride thereof, or from [L]-trans - 2 - dichloromethyl-5-phenyl-4-carbethoxy-oxazoline.

A solution of 0.14 gr. of LiAlH$_4$ in ether was poured, while vigorously stirring, into a solution of 2.4 gr. of [L]-trans - 2 - dichloromethyl - 5 - p.nitrophenyl-4-carbethoxy-oxazoline in a mixture of ether and benzene, said solution being cooled at 0° C. An organo-metallic complex similar to that of Example 3 was obtained.

A highly diluted solution of formic acid in aqueous methyl alcohol was poured into the reaction mixture containing said complex. After evaporating the solvents over a steam bath, N-dichloroacetyl-[L]-threo-β-p.nitrophenyl-serinol (so-called chloramphenicol) crystallized by cooling from the remaining aqueous solution. Melting point after two recrystallizations from water: 150–151° C.

The diagrammatic reaction is the same as in Example 3.

What I claim is:

1. A method for the preparation of N-acyl-β-(p-nitrophenyl)-serinols corresponding to the following general formula:

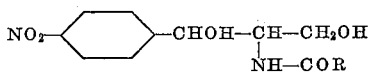

in which R is a radical member of the group consisting in phenyl, methyl and CHCl$_2$ radicals, comprising the steps of selectively reducing the carbo-alkoxy group in position 4 of an oxazoline corresponding to the following general formula:

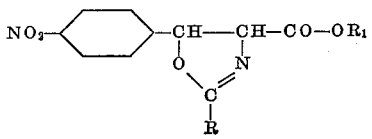

in which R is the same as above and R$_1$ is a lower alkyl radical, using a substantially stoichiometrical proportion of lithium-aluminum hydride in ether solution, while vigorously stirring, at a temperature of about 0° C., and then hydrolyzing the intermediary oxazoline complex formed by means of an acid water being added in several steps when a strong acid is used, for finally obtaining a N-acyl-β-(p-nitrophenyl)-serinol.

2. A method for the preparation of N-acyl-β-(p-nitrophenyl)-serinols corresponding to the following general formula:

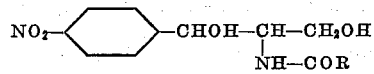

in which R is a radical member of the group consisting in phenyl, methyl and CHCl$_2$ radicals, comprising the steps of selectively reducing the carbo-alkoxyl group in position 4 of an oxazoline corresponding to the following general formula:

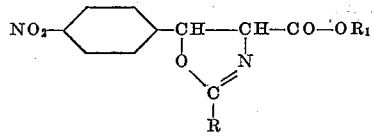

in which R is the same as above and R$_1$ is a lower alkyl radical, using a substantially stoichiometrical proportion of lithium-aluminum hydride in ether solution, while vigorously stirring, at a temperature of about 0° C., and then hydrolyzing the intermediary oxazoline complex formed by means of a weak acid, for finally obtaining a N-acyl-β-(p-nitrophenyl)-serinol.

3. A method as set forth in claim 2, in which the weak acid is formic acid.

4. A method for the preparation of N-acyl-β-(p-nitrophenyl)-serinols corresponding to the following general formula:

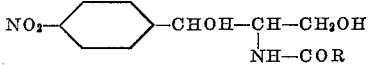

in which R is a radical member of the group consisting in phenyl, methyl and CHCl$_2$ radicals, comprising the steps of selectively reducing the carbo-alkoxyl group in position 4 of an oxazoline corresponding to the following general formula:

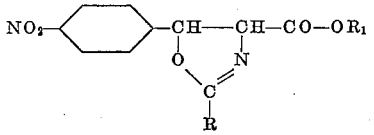

in which R is the same as above and R$_1$ is a lower alkyl radical, using a substantially stoichiometrical proportion of lithium-aluminum hydride in ether solution, while vigorously stirring, at a temperature of about 0° C., and then hydrolyzing the intermediary oxazoline complex formed by means of a strong acid, for finally obtaining a N-acyl-β-(p-nitrophenyl)-serinol.

5. A method for the preparation of a N-dichloroacetyl-β-(p-nitrophenyl)-serinol corresponding to the following formula:

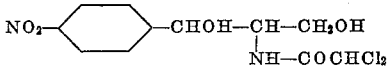

comprising the steps of selectively reducing the carboethoxyl group of the oxazoline corresponding to the following formula:

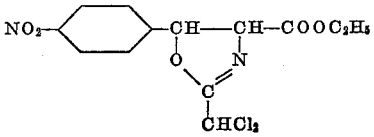

using a substantially stoichiometrical proportion of lithium-aluminum hydride in ether solution, while vigorously stirring, at a temperature of about 0° C., and then hydrolyzing the intermediary oxazoline complex formed by means of a weak acid, for obtaining N-dichloracetyl-β-(p-nitrophenyl)-serinol.

6. A method as set forth in claim 5, in which the weak acid is diluted formic acid.

7. A method for the preparation of N-dichloroacetyl [L]-threo-β-p.nitrophenyl serinol comprising the steps of selectively reducing the carbo-ethoxyl group of [L]-trans - 2 - dichloromethyl - 5-p.nitrophenyl-4-carbethoxy-oxazoline using a substantially stoichiometrical proportion of lithium-aluminum hydride in ether solution, while vigorously stirring, at a temperature of about 0° C. to produce an intermediary oxazoline organic metallic complex, and then hydrolyzing the intermediary oxazoline organo metallic complex formed by means of an aqueous acid to produce the stated serinol.

8. A method as set forth in claim 7 in which the acid is formic acid.

References Cited in the file of this patent

UNITED STATES PATENTS

| 2,513,346 | Moersch et al. | July 4, 1950 |
| 2,562,114 | Moersch et al. | July 24, 1951 |

FOREIGN PATENTS

| 275,968 | Switzerland | Oct. 1, 1951 |
| 499,681 | Belgium | Dec. 15, 1950 |
| 501,677 | Belgium | Mar. 31, 1951 |
| 501,678 | Belgium | Mar. 31, 1951 |

OTHER REFERENCES

Felkin: "Comptes Rendus," vol. 230 (1950), pp. 304 to 306.

Felkin: "Comptes Rendus," vol. 231 (1950), pp. 1316 to 1318.

Bergmann et al.: "J. Chem. Soc." (London), 1951, pp. 2673 to 2678.